United States Patent [19]

Cuscurida et al.

[11] 3,968,089

[45] July 6, 1976

[54] POLYMER-PREPOLYMER COMPOSITION PREPARED BY POLYMERIZING AN ETHYLENICALLY UNSATURATED MONOMER IN THE PRESENCE OF AN ISOCYANATE-TERMINATED PREPOLYMER

[75] Inventors: Michael Cuscurida; George Phillip Speranza, both of Austin, Tex.

[73] Assignee: Jefferson Chemical Company, Inc., Houston, Tex.

[22] Filed: Nov. 18, 1974

[21] Appl. No.: 524,567

[52] U.S. Cl. .................. 260/859 R; 260/2.5 BE; 260/859 PV
[51] Int. Cl.² .................. C08G 18/14; C08L 27/00
[58] Field of Search .................. 260/2.5 BE, 859 PV, 260/859 R

[56] References Cited
UNITED STATES PATENTS

| | | | |
|---|---|---|---|
| 3,644,569 | 2/1972 | Pietsch et al. | 260/859 R |
| 3,684,758 | 8/1972 | Honig et al. | 260/859 PV |
| 3,700,752 | 10/1972 | Hutchinson | 260/859 R |
| 3,868,431 | 2/1975 | Hutchinson | 260/859 R |

*Primary Examiner*—M. J. Welsh
*Attorney, Agent, or Firm*—James L. Bailey; Lee G. Meyer

[57] ABSTRACT

Novel isocyanate-terminated polyether-based polymer prepolymers useful in urethane applications are produced by polymerization of one or more ethylenically unsaturated monomers in the presence of an isocyanate-terminated prepolymer obtained by reaction of an organic polyisocyanate with a polyhydroxy-containing adduct obtained by reacton of an alkylene oxide with a polyfunctional initiator containing two to six active hydrogen atoms. These isocyanate-terminated polyether-based polymers prepolymer compositions are useful in the preparation of flexible urethane foams and moisture-cured adhesives.

21 Claims, No Drawings

POLYMER-PREPOLYMER COMPOSITION PREPARED BY POLYMERIZING AN ETHYLENICALLY UNSATURATED MONOMER IN THE PRESENCE OF AN ISOCYANATE-TERMINATED PREPOLYMER

BACKGROUND OF THE INVENTION

1. Field of the Invention

The present invention relates to novel isocyanate-terminated polyether-based polymer prepolymer compositions which are especially useful in the preparation of high resiliency flexible polyurethane foams and moisture-cured adhesives. More particularly, this invention relates to an improved process for preparing isocyanate-terminated prepolymers whereby one or more ethylenically unsaturated monomers are polymerized in the presence of an isocyanate-terminated polyether-based prepolymer to form a composition comprising a stable dispersion of the polymer in the prepolymer in admixture with a proportion of polymer grafted onto the isocyanate-terminated prepolymer.

2. Description of the Prior Art

Polyurethanes constitute a broad class of polymeric materials having a wide range of physical characteristics. The polymers are produced through the interaction of a polyfunctional isocyanate with a polyfunctional chemical compound having an active hydrogen in its structure, such as a polyester or polyether or mixtures of two or more of such materials. The materials conventionally used contain two or more hydroxyl groups and are thus generally termed polyols. In the preparation of flexible polyurethane foams, it is sometimes advantageous to employ a method known as the quasi-prepolymer method wherein a portion of the polyether polyol component is reacted with an excess of isocyanate. Then in a second step the quasi-prepolymer is mixed with the balance of the polyether polyol along with a blowing agent and catalyst to produce the polyurethane foam. Despite the variety of physical and chemical properties obtainable by proper selection of the polyisocyanate and the polyol, as well as the conditions under which the reaction is carried out, there are definite limitations in the properties obtained in the resulting polyurethane composition.

It is known in the art that the addition of a high molecular weight polymer to polyurethane composition will improve certain of the physical properties of the resulting polyurethane composition. There have been many efforts with respect to incorporating polymers into such polyurethane compositions. See for example, U.S. Pat. No. 3,383,351 which discloses the in situ polymerization of an ethylenically unsaturated monomer in the presence of the polyol component of a polyurethane composition. These compositions are known in the art as polymer/polyols or graft polymers. For other examples of the state of the art with respect to such products, see U.S. Pat. 3,304,273; 3,652,639; 3,405,162; 3,546,321 and 3,110,695.

Despite the great amount of art relating to the incorporation of polymer/polyols into polyurethane compositions, there still remains several problems not solved by the compositions known in the art. There is still a need for polyurethane foam compositions which will result in foams with an improved tensile and tear strength, which have a uniform cell structure and which upon curing, do not show an appreciable shrinkage. None of the polyurethane formulations of the prior art which employ the polymer polyols is completely satisfactory for these purposes.

Accordingly, it is an object of this invention to provide an isocyanate-terminated polyether-based prepolymer composition into which is incorporated one or more polymerized ethylenically unsaturated monomers. The resulting isocyanate-terminated polyether-based polymer prepolymer composition can be thereafter reacted with additional polyol to form a flexible polyurethane foam having improved physical properties and without appreciable shrinkage of the polyurethane reaction product.

It is also an object of this invention to provide isocyanate-terminated polymer prepolymer compositions which have exceptional stability and do not exhibit large viscosity increases upon prolonged storage.

A further object of the invention is to provide a novel method of forming polyurethanes utilizing high molecular weight polymer polyisocyanates as one of the components in the polyurethane formulation. Such products show special utility in the preparation of adhesives, coatings, elastomers, etc.

The advantages and other objects of this invention will become apparent to those skilled in the art in view of the aforementioned background, the following discussion, and the accompanying examples.

SUMMARY OF THE INVENTION

It has been found that novel isocyanate-terminated polyether-based polymer prepolymer compositions are formed by the in situ polymerization of one or more ethylenically unsaturated monomers in the presence of an isocyanate-terminated prepolymer. These isocyanate-terminated polymer prepolymers have excellent stability and, when reacted with additional polyether polyol, produce a flexible polyurethane foam with improved physical properties and without appreciable shrinkage of the polyurethane reaction product. The isocyanate-terminated polyether-based polymer prepolymer compositions are also useful in the preparation of one component moisture-cured adhesives and elastomers.

DESCRIPTION OF THE PREFERRED EMBODIMENTS

In accordance with the process of this invention, one or more ethylenically unsaturated polymerizable monomers are polymerized in the presence of an isocyanate-terminated polyether-based prepolymer to form a stable dispersion of polymer in the isocyanate-terminated prepolymer composition. This stable dispersion is referred to generally as an isocyanate-terminated polymer prepolymer.

The Ethylenically Unsaturated Monomer

The monomers useful in practicing this invention are the polymerizable ethylenically unsaturated monomers characterized by the presence therein of at least one polymerizable ethylenic group. The monomers can be used singly to produce a homopolymer/isocyanate-terminate prepolymer or in combination to produce copolymer/isocyanate-terminated prepolymer compositions.

These monomers are well-known in the art and include the hydrocarbon monomers such as butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, p-vinyl diphenyl sulfide, p-vinylphenyl phenyl oxide, and the like; the acrylic and substituted acrylic monomers which are non-reactive with isocyanato groups, such as methylacrylate, methyl methacrylate, cyclohexyl methacrylate, benzyl methacrylate, isopropyl methacrylate, octyl methacrylate, methacrylonitrile, methyl alphachloracrylate, ethyl alphaethoxyacrylate, methyl alphaacetaminoacrylate, butyl acrylate, 2-ethylhexyl acrylate, phenyl acrylate, phenyl methacrylate, alphachloroacrylonitrile, and the like; the vinyl esters and vinyl ethers, such as vinyl acetate, vinyl chloracetate, vinyl butyrate, isopropenyl acetate, vinyl formate, vinyl acrylate, vinyl methacrylate, vinyl methoxy acetate, vinyl benzoate, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1, 2-pyran, 2-butoxy-2'-vinyloxy diethyl ether, vinyl 2-ethylmercaptoethyl ether, vinyl methyl ketone, vinyl ethyl ketone, vinyl phenyl ketone, and the like; dimethyl fumarate, dimethyl maleate, monomethyl itaconate, dimethylaminoethyl methacrylate, glycidyl acrylate, dichlorobutadiene, vinyl pyridine, and the like. Any of the known polymerizable monomers which are not reactive with the isocyanato group can be used and the compounds listed above are illustrative and not restrictive of the monomers suitable for use in this invention.

The ethylenically unsaturated monomers which are preferred in the practice of this invention include the hydrocarbon monomers such as butadiene, isoprene, styrene, α-methylstyrene, and the like; and the acrylic and substituted acrylic monomers which are non-reactive with isocyanato groups, such as methylacrylate, methyl methacrylate, acrylonitrile, and methacrylonitrile.

Especially preferred in the practice of this invention is a mixture of acrylonitrile with one or more of the previously mentioned hydrocarbon monomers. For economic reasons, styrene is the most preferred hydrocarbon monomer, and thus the most preferred mixture of monomers for use in the practice of this invention comprises a mixture of acrylonitrile and styrene.

The Isocyanate-Terminated Prepolymer Composition

The isocyanate-terminated polyether-based prepolymer composition in which the in situ polymerization of the ethylenically unsaturated monomer is effected is formed by the reaction of an organic polyisocyanate with a polyether polyol component. This results in a composition in which one isocyanato group of the polyisocyanate reacts with a hydroxyl group of the polyether polyol to produce a polyether-based prepolymer composition with terminal isocyanato groups. This isocyanate-terminated polyether-based prepolymer composition will have a negligible hydroxyl number indicating that all of the available hydroxyl groups have been reacted with isocyanato groups.

The polyether polyol components useful in preparing the prepolymer composition include polyols having a functionality of from two to about six and having a molecular weight of from about 2,000 to 10,000. These polyether polyols are prepared by a well-known process which involves the reaction of a polyhydric initiator such as trimethylolpropane, glycerol, 1,2,6-hexanetriol, sorbitol, pentaerythritol, and the like, with an alkylene oxide such as ethylene oxide, propylene oxide and butylene oxide, or mixtures of ethylene oxide with propylene oxide and/or butylene oxide. This reaction is carried out in a well-known manner with an alkoxylation catalyst, generally an alkali metal hydroxide such as potassium hydroxide. The alkoxylation reaction is continued until the product attains the desired molecular weight. It is necessary to then react the product made as described above with ethylene oxide in order to acquire primary hydroxyl group termination of the polyether chains. This process is described in U.S. Pat. No. 3,336,242 for example. The percentage of primary hydroxyl group terminating the polyether chain is generally increased by an addition of ethylene oxide alone; however, it will be understood that ethylene oxide mixed with some proportions of propylene oxide will also achieve this result. Also, it is within the scope of the invention to use a polyether polyol which may have blocked segments of different alkylene oxides in the molecule and not solely limiting such segments of ethylene oxide to the terminal positions.

The preferred polyether polyols are the polyether diols and triols having a molecular weight of from about 2,000 to about 7,000 and having from about 40 percent to about 80 percent primary hydroxyl groups. These polyols may be used alone in combination, or in a mixture with other polyether polyols.

Especially preferred polyether polyols are the polyether triols having a molecular weight of from about 4,000 to about 7,000 and from about 25 percent to about 75 percent primary hydroxyl groups. Although triols having molecular weights of about 3,000 can be used to produce a flexible polyurethane foam, it has been found that the molded foam produced has significantly more closed cells and the foams themselves are not as resilient.

Preferred polyether diols are, for example, polypropylene glycols or mixed polypropylene glycol-polyethylene glycol copolymers having a molecular weight from about 2,000 to about 5,000. These materials are produced by reacting ethylene oxide, propylene oxide, or a butylene oxide, either sequentially or in admixture with an initiator such as, for example, ethylene glycol, propylene glycol or butylene glycol.

The polyisocyanate components which are useful in preparing the prepolymer compositions include isocyanates having two or more isocyanato groups per molecule. Examples of such isocyanates are: toluene diisocyanates, such as the 2,4- and 2,6-isomers; and their mixtures, methylene bis(phenylisocyanates), such as the 2,2'-, 2,4'- and 4,4'-isomers and mixtures thereof. Other representative aromatic isocyanates include 1,5naphthylene diisocyanate, phenyl diisocyanate and xylylene diisocyanate, trimethylhexamethylene diisocyanate, lysine diisocyanate methyl ester, methylene bis(-cyclohexylisocyanate) and its various isomers and mixtures thereof, and the like. Mixtures of diisocyanates and polymeric isocyanates can be employed. Exemplary mixtures are described in U.S. Pat. No. 3,362,979. Typical of the isocyanates generally used in preparation of polyurethane foams include toluene diisocyanates, polymethylene polyphenyl polyisocyanates having a functionality of from about 2.1 to about 3.0, and the like. Diphenylmethane diisocyanates, and various aliphatic isocyanates or any of the above-mentioned isocyanates can be suitably employed in the preparation of the isocyanate-terminated polyether-based prepolymers employed in this invention.

In preparing the isocyanate-terminated polyether-based prepolymer compositions, the polyisocyanate and the polyether polyol are combined in amounts such that there is an excess of the organic polyisocyanate employed. Generally, an equivalent ratio of isocyanato groups to hydroxy groups, commonly known as the isocyanate index of from about 25 to about 2 is satisfactory with an isocyanate index of from about 20 to about 4 being preferred. The organic polyisocyanate is generally reacted with the polyether polyol under an inert atmosphere at an elevated reaction temperature of approximately 50° to 150°C., with a temperature of approximately 100°C. being preferred until all of the hydroxyl grups have been treated with isocyanato groups to form the prepolymer composition.

In one modification of the instant invention, the isocyanate-terminated polyether-based prepolymer is separately formed, after which, the polymerization of the ethylenically unsaturated monomer(s) is effected as will be hereinafter described. In an alternate modification of this invention the isocyanate-terminated polyether-based prepolymer is prepared simultaneously with the polymerization of the ethylenically unsaturated monomers in an over-all one-step process.

Preparation of the Polymer Prepolymer Composition.

The isocyanate-terminated polyether-based polymer prepolymer composition of this invention is produced by polymerizing the aforementioned ethylenically unsaturated monomers in the presence of the isocyanate-terminated prepolymer composition at a temperature of from about 50°C. to about 150°C. in the presence of a catalytically effective amount of a conventional free radical catalyst known to be suitable for the polymerization of ethylenically unsaturated monomers. The concentration of the catalysts can vary from about 0.25 to about 2.5 percent, with an amount of from about 1.0 to about 2.0 percent being preferred. However, any effective catalytic amount is satisfactory. The resulting isocyanate-terminated prepolymer composition will contain a proportion of polymer dispersed in the isocyanate-terminated polyether-based prepolymer, and a proportion of polymer which is chemically attached to the isocyanate-terminated polyether-based prepolymer (a graft polymer).

Illustrative free radical catalysts which are non-reactive with the isocyanato groups present in the reaction mixture and which are effective in the practice of this invention are, for example, the peroxides and the azo compounds, including dibenzoyl peroxide, acetyl peroxide, di-t-butyl peroxide, lauroyl peroxide, butyryl peroxide, diacetyl peroxide, di-alpha-cumyl peroxide, dipropyl peroxide, diisopropyl peroxide, isopropy-t-butyl peroxide, butyl-t-butyl dilauroyl peroxide, difuroyl peroxide, ditriphenylmethyl peroxide, bis(p-methoxybenzoyl)peroxide, p-mono-methoxybenzoyl peroxide, t-butyl peroxybenzoate, diethyl peroxyterephthalate, alpha,alpha'-azo-2-methyl butyronitrile, alpha,alpha'-2-methyl heptonitrile, 1,1'-azo-1-cyclohexane carbonitrile, dimethyl alpha-alpha'-azo-isobutyrate, azobisisobutyronitrile, and the like. The preferred free radical catalysts are the azo compounds, and especially preferred is azobisisobutyronitrile.

The polymerization of the ethylenically unsaturated monomers as described herein does not require the presence of a solvent. However, the polymerization can be carried out in the presence of an organic solvent which is inert to the reaction environment. Suitable solvents include toluene, benzene, acetonitrile, ethyl acetate, heptane, dimethylformamide, dimethylacetamide, and the like, including those known in the art as being suitable solvents for the polymerization of vinyl monomers. The only requirement in the selection of the solvent is that it not interfere with the polymerization of the monomers, and that it not be reactive with the isocyanato groups present.

The amount of ethylenically unsaturated monomer which is polymerized and incorporated into the isocyanate-terminated polyether-based polymer prepolymer of this invention will vary, depending upon the particular monomers employed, as well as upon the properties desired in the polyurethane composition which is to be prepared from the polymer prepolymer. In general, the ethylenically unsaturated monomers are present in the composition in an amount of from about 5 to about 25 percent by weight based on the total isocyanate-terminated polyether-based polymer prepolymer composition, with an amount of from about 10 to about 20 percent by weight on the same basis being preferred.

In carrying out the in situ polymerization of the ethylenically unsaturated monomer(s) as hereinbefore described, the monomer(s) is added to the prepolymer composition, along with the selected free radical polymerization catalyst, and the polymerization reaction is allowed to proceed under an inert atmosphere at a temperature of from about 50°C. to about 150°C. until the polymerization reaction is completed. In another modification of this invention the desired monomer(s) is added to the prepolymer composition or prepolymer precursor composition incrementally over a period of time in order to control the rate at which the polymerization reaction proceeds. At the end of the polymerization reaction, the unreacted monomers are then removed from the isocyanate-terminated polymer prepolymer composition, as for example, by vacuum stripping.

The isocyanate-terminated polyether-based graft prepolymer compositions of this invention are particularly useful in preparing polyurethane foams of improved physical properties. Polyurethane foams prepared according to this invention are the reaction products of an isocyanate-terminated polyether-based polymer prepolymer composition of this invention, and a polyether polyol component. The foam is produced by conducting the above reaction catalytically in the presence of water, and optionally an inert blowing agent.

The polyether polyol component useful in preparing the polyurethane foam composition of this invention are the same polyether polyols as have been described as useful in preparing the isocyanate-terminated polyether-based prepolymer compositions described herein.

It has also been found desirable in many instances to include in the polyurethane formulation a cross-linker or chain extender. Traditionally, a number of cross-linkers or chain extenders have been employed in semi-flexible integral skin foams and elastomers. Such materials have also been used in some instances to prepare flexible foams, and the like. Conventional cross-linkers include aliphatic diols or polyols such as ethylene glycol, 1,4-butanediol, glycerol, glycerol-alkylene oxide adducts, trimethylolpropane, trimethylolpropane-alkylene oxide adducts, pentaerythritolalkylene oxide adducts, sorbitol-alkylene oxide adducts, and the like. Amine cross-linkers commonly employed are triethanolamine, and its alkylene oxide adducts; alkylene oxide adducts of ethylenediamine; alkylene oxide adducts of diethylenetriamine; and the like. Other cross-linkers such as those disclosed in U.S. Pat. Nos. 3,382,284; and 3,072,582 can be suitably employed. Alkylene oxide adducts of aniline, methylene dianiline, chlorinated methylene dianiline and chlorinated benzidine are other representative cross-linkers. Chain extenders prepared by reacting monoalkanolamines with ethylene carbonate or propylene carbonate as described in U.S. Pat. No. 3,595,814 can also be employed.

Desirably, the polyurethane formulation will include a suitable catalyst to promote one or more of the various possible reactions. Depending upon the type of urethane desired, the skilled artisan can select the catalytic material of choice. Triethylenediamine; N-methyl- or N-ethylmorpholine; N,N-dimethylcyclohexylamine; N,N-dimethylethanolamine; N,N'-dimethylpiperazine; trimethylamine; N,N'-bis (2-hydroxypropyl)-2 methyl piperazine; trimethylaminoethyl piperazine, N,N,N',N'-tetramethyl-1,3-propanediamine; teriary polyoxyalkylene polyamines, as described in U.S. Pat. No. 3,660,319; 2-dimethylaminoethyl-3-dimethylaminopropyl ether; 2,2'-dimorpholinodiethyl ether; other amines as described in U.S. Pat. No. 3,330,782; and amine catalysts described in U.S. Pat. Nos. 2,941,967; 3,645,925; 3,661,808; and 3,313,744 are exemplary amine catalysts. Organometallic catalysts can also be used in combination with the amine catalyst or independently thereof. Organometallic compounds such as dibutyltin dilaurate; dibultyltin dioctoate; dioctyltin oxide; dimethyltin diacetate; phenylmercuric propionate; stannous octoate; and such organometallic catalysts as are described in U.S. Pat. Nos. 3,592,787; 3,419,509; 3,583,945; 3,398,106; 3,397,158; 3,075,927; and 3,084,177 are representative.

Polyurethane formulations of the instant invention which are employed in the preparation of polyurethane foams will include blowing agents. Preferably, a small amount of surfactant is employed in conjunction with the blowing agent. The blowing agent can be any of those known to be useful for this purpose, e.g., water, halogenated hydrocarbons, hydrocarbons, and the like. Flexible and semiflexible foams are conventionally blown with carbon dioxide from the water-isocyanate reaction or a combination of water and volatile blowing agent. The water level in such instances is generally in the range of about 1.5 to about 4.5 parts by weight based on the weight of the polyurethane formulations and the volatile blowing agent level in such instances is generally in the range of 0 to 20 parts by weight depending of course, on the density and hardness desired. Integral skin foams are generally blown with only an inert blowing agent. Generally an amount in the range of about 5 to about 25 parts by weight, depending upon the density desired, is employed. Gas or gas producing materials which include the lower molecular weight alkanes, alkenes, dialkyl ethers, halogenated hydrocarbons, and the like, are suitable volatile blowing agents. Monofluorotrichloromethane; difluorodichloromethane; 1,1,2-trichloro, 1,2,2-trifluoroethane; dichlorotetrafluoroethane; methylene chloride and ethyl chloride are representative halogenated hydrocarbons.

Silicone oils such as those described in U.S. Pat. Nos. 2,834,748; 3,313,744; and 3,647,724 are representative surfactants that can be employed in preparing polyurethane foams. Depending on the properties and the utility desired of the polyurethane composition, various other components can be utilized. For example, various additives such as talc, mica, clay, titanium dioxide, carbon black, wood pulp, silica, barium sulfate, calcium carbonate, dyes, asbestos, fibrous glass, synthetic fibers, and the like, can be employed in the polyurethane formulation as fillers or for other purposes. Paraffin oils, castor oil, polyvinyl chloride, and other materials have been conventionally included, as well. The addition of other antioxidants or stabilizers, plasticizers, emulsifiers, wetting agents, smoke-inhibiting agents, fire retardants, and the like, can be employed as well.

The isocyanate-terminated polyether-based polymer prepolymers of this invention are also useful in the preparation of moisture-cured adhesives which have improved properties over similar adhesives prepared from non-grafted prepolymers.

The use of the isocyanate-terminated polyether-based graft prepolymers of this invention will now be further illustrated in the following examples, which are for the purposes of illustration and should not be considered a limitation of the scope of the invention.

EXAMPLE I

The following experiment represents one modification of the instant invention wherein a two-step method was employed in preparing an isocyanate-terminated polymer prepolymer. In the first step an isocyanate-terminated polyether-based prepolymer composition was prepared. In the second step, the polymerization of an ethylenically unsaturated monomer was carried out in the presence of this prepolymer to form the resulting isocyanate-terminated polyether-based polymer prepolymer composition.

Step 1

Into a one-liter three-necked flask equipped with a stirrer, thermometer, condenser, dropping funnel and a nitrogen source was charged 400 g. THANOL SF-5503 (a 5500 molecular weight adduct of trimethylolpropane with ethylene oxide and propylene oxide) and 143 g. of a 4:1 weight mixture of toluene diisocyanate and a polymethylene polyphenyl polyisocyanate having a functionality of 2.7. Maintaining a nitrogen purge, the reaction mixture was heated at 95°–105°C. for four hours. The resulting prepolymer composition which contained excess polyisocyanate was then cooled to room temperature.

Step 2

Into the prepolymer composition prepared according to Step 1, was added 3 g. benzoyl peroxide and the reaction mixture was heated to 90°C. A mixture of 30 g. styrene and 30 g. acrylonitrile was then added dropwise over a two-hour period. After a four hour digestion period at 95°–105°C. the product was then vacuum stripped to 125°C. at 2 mm Hg pressure. A total of 2.5 g. unreacted monomer was caught in a cold trap which corresponded to a monomer conversion of 96 percent. The resulting product was a dark brown, viscous liquid which analyzed as having 8.28% free isocyanate (theory 8.48%).

EXAMPLE II

This example illustrates another modification of the instant invention in which the isocyanate-terminated polyether-based polymer prepolymer is prepared in a one-step process wherein the isocyanate-terminated polyether-based prepolymer is formed simultaneously with the polymerization of the ethylenically unsaturated monomer to form the resulting isocyanate-terminated polyether-based polymer prepolymer.

Into a ten gallon kettle were charged 5.63 lbs. THANOL SF-5503 polyol and 11.25 lbs. THANATE P-210, a polymethylene polyphenyl polyisocyanate having a functionality of 2.1, and 28 g. azobisisobutyronitrile (ABIN). The reactor kettle was then evacuated and purged with pre-purified nitrogen after which the reaction charge was heated to 100°C, and a mixture of 5.63 lbs. THANOL SF-5503 polyol, 1.25 lbs. styrene and 1.25 lbs. acrylonitrile was added over a three-hour period. At one-hour intervals, 28 g. ABIN was added to the reaction mixture for a total over the four-hour period of 112 g. The reaction mixture was then digested two hours at 100°C. after which it was stripped to a minimum pressure at 100°C. This was followed by nitrogen stripping for one-half hour. The finished product was a light brown, opaque, viscous liquid having the following properties:

| | |
|---|---|
| Isocyanate content, meq./g. | 3.07 |
| Isocyanate equivalent weight | 334 |
| Viscosity, 25°C., cps | |
| Initially | 6100 |
| After 12 months | 6330 |

EXAMPLE III

This experiment illustrates the preparation of an isocyanate rich polymer prepolymer from THANOL SF-5503 polyol and a 2.2 functionality polymeric isocyanate (THANATE P-220).

Into a 10-gallon kettle were charged 11.25 lbs. THANOL SF-5503 polyol, 11.25 lbs. THANATE P-220 (a polymethylene polyphenyl polyisocyanate having a functionality of 2.4) and 112 g. azobisisobutyronitrile. The kettle was then evacuated and purged with prepurified nitrogen. The reaction mixture was then heated to 85°C. and a mixture of 1.25 lbs. styrene and 1.25 lbs. acrylonitrile was added over a two-hour period. The reaction mixture was then digested two hours at 90°C. At the end of the digestion period, the product was vacuum stripped to a minimum pressure. This was followed by nitrogen stripping for one-half hour. Monomer conversion was 91 percent. The finished product was a light brown, opaque, viscous liquid having the following properties:

| | |
|---|---|
| Isocyanate content, meq./g. | 2.91 |
| Isocyanate equivalent weight | 344 |
| Viscosity, 25°C, cps | 15,500 |

EXAMPLE IV

This experiment illustrates the preparation of an isocyanate-terminated polymer prepolymer from THANOL SF-5503 polyol and isophorone diisocyanate, an aliphatic isocyanate.

Into a two-liter three-necked flask equipped with a stirrer, thermometer, condenser, dropping funnel, and a nitrogen source was charged 225 g. THANOL SF-5503 polyol and 450 g. isophorone diisocyanate. Maintaining a nitrogen purge, the reaction mixture was heated to 98°C. and a mixture of 225 g. THANOL SF-5503 polyol, 50 g. acrylonitrile, 50 g. styrene, 0.1 g. dibutyltin dilaurate, and 10.0 g. azobisisobutyronitrile added at 95°–98°C. over a 3.3 hour period. The reaction mixture was then stripped to 120°C. at 3 mm. Monomer conversion was 94.3 percent. The final product was a light yellow, opaque, viscous liquid having the following properties:

| | |
|---|---|
| Isocyanate content, meq./g. | 3.62 |
| Isocyanate equivalent weight | 277 |
| Viscosity, 25°C., cps | |
| Initially | 1250 |
| After 11 months | 2440 |

EXAMPLE V

This experiment illustrates the preparation of an isocyanate rich polymer prepolymer from THANOL SF-5503 polyol and toluene diisocyanate.

Into a two-liter three-necked flask equipped with a stirrer, thermometer, condenser, dropping funnel and a nitrogen source was charged 225 g. THANOL SF-5503 polyol and 450 g. toluene diisocyanate. Maintaining a nitrogen purge, the reaction mixture was heated to 91°C. and a mixture of 225 g. THANOL SF-5503 polyol, 10 g. azobisisobutyronitrile, 50 g. styrene, and 50 g. acrylonitrile added dropwise over a four-hour period. This was followed by a two-hour digestion period. The reaction mixture was then stripped to a reduced pressure of 15 mm.Hg. at 120°C. The monomer conversion was 95%. The final product had the following properties:

| | |
|---|---|
| Isocyanate content, meq./g. | 4.0 |
| Isocyanate equivalent weight | 250 |
| Viscosity, 25°C., cps | 8200 |

EXAMPLE VI

This experiment illustrates the use of the isocyanate rich polymer prepolymer derived from THANOL SF-5503 polyol and THANATE P-210 polyisocyanate (Example II) in the preparation of moisture-cured adhesives. It will further show the improved properties of adhesives prepared from the isocyanate-terminated polymer prepolymer as compared to an adhesive prepared from a THANOL SF-5503 polyol - THANATE P-210 polyisocyanate prepolymer which had been prepared by reaction of an equal weight mixture of THANOL SF-5503 polyol and THANATE P-210 polyisocyanate for four to five hours at 90°C. The adhesives were prepared as follows: To 100 g. of the isocyanate terminated polymer prepolymer of Example II were charged 20 g. P-33 carbon black (R. T. Vanderbilt) and 2.5 g. Cab-O-Sil (Cabot Corporation). The mixture was then thoroughly dispersed with a high shear mixer. The moisture-cured adhesive prepared from the isocyanate terminated graft exhibited thixotropic characteristics while the adhesive prepared from the THANOL SF-5503 polyol - THANATE P-210 polyisocyanate prepolymer flowed freely. In addition, the cured adhesive from the polymer prepolymer had a tensile shear (aluminum-to-aluminum as determined by ASTM- 1002) of 1179 psi. as compared to 742 psi. for the cured adhesive from the conventional prepolymer.

EXAMPLE VII

This experiment illustrates the use of the isocyanate terminated graft prepolymer derived from THANOL SF-5503 polyol and THANATE P-220 polyisocyanate (Example III) in the preparation of a moisture-cured adhesive. It will further show the improved properties of adhesives prepared from the polymer prepolymer compared to an adhesive prepared from a THANOL SF-5503 polyol - THANATE P-220 polyisocyanate prepolymer. The prepolymer was prepared by reaction of an equal weight mixture of THANOL SF-5503 polyol and THANATE P-220 polyisocyanate for four to five hours at 90°C. The adhesives were prepared from these materials as described in Example VI. The mositure-cured adhesive prepared from the polymer prepolymer exhibited thixotropic characteristics while the adhesive from the THANOL SF-5503 polyol - THANATE P-220 polyisocyanate prepolymer flowed freely. In addition, the cured adhesive from the polymer prepolymer had a tensile shear (aluminum-to-aluminum as determined at A.S.T.M. - 1002) of 800 psi. as compared to 538 psi. for the cured adhesive from the conventional prepolymer.

EXAMPLE VIII

This experiment will illustrate the use of isocyanate terminated polymer prepolymers prepared as described in Examples II and III in the preparation of flexible polyurethane foams. It will further show the improved properties of flexible foams prepared from these graft prepolymers as compared to flexible polyurethane foams prepared from THANOL SF-5503 polyol and THANATE P-210 or THANATE P-220 polyisocyanates. Formulations, details of preparation, and foam properties are shown in the following table:

Table 1

| Foam no. | A | B | C | D |
|---|---|---|---|---|
| Formulation, pbw. | | | | |
| THANOL SF-5503 polyol | 50 | 100 | 50 | 100 |
| Water | 3.0 | 3.0 | 3.0 | 3.0 |
| Dabco LV-33[1] | 0.3 | — | 0.3 | — |
| THANCAT DM-70[2] | 0.25 | — | 0.25 | — |
| Niax A-1[3] | 0.12 | — | 0.12 | — |
| THANCAT TAP[4] | — | 2.0 | — | 2.0 |
| Dibutyltin dilaurate | — | — | 0.02 | — |
| Polyisocyanate polymer prepolymer[5] | 124.5 | — | — | — |
| Polyisocyanate polymer prepolymer[6] | — | — | 128.5 | — |
| THANATE P-210 polyisocyanate | — | 55.2 | — | — |
| THANATE P-220 polyisocyanate | — | — | — | 55.2 |
| Isocyanate index | 1.05 | 1.05 | 1.05 | 1.05 |
| Details of preparation | | | | |
| Cream time, sec. | 12 | 8 | 10 | 8 |
| Rise time, sec. | 180 | 80 | 180 | 75 |
| Gel time, sec. | — | 120 | 270 | 90 |
| Properties | | | | |
| Density, pcf. | 2.5 | 2.2 | 2.5 | — |
| Tensile, psi | 18.4 | 14.5 | 16.3 | Foam Shrank badly; Could not be tested |
| Elongation, % | 137 | 183 | 97 | |
| Tear, pli | 1.9 | 1.1 | 1.6 | |
| Compression set | | | | |
| 50% | 12.1 | 21.7 | 25.8 | |
| 75% | 9.2 | 85.8 | 16.0 | |
| Humid aging (5 hrs. at 250°F.) | | | | |
| Compression set, 50% | 16.2 | 48.4 | 23.4 | |

Table 1-continued

| Foam no. | A | B | C | D |
|---|---|---|---|---|
| CLD loss, 50% | 39.2 | 25.7 | 32.6 | ed |

[1]33% Triethylenediamine, 67% Dipropylene Glycol, Houdry Process and Chemical Co.
[2]A mixture of dimorpholinodiethylether and dimethylpiperazine, Jefferson Chemical Co.
[3]Dimethylaminoethyl ether, Union Carbide Chemical Co.
[4]Trimethylaminoethylpiperazine, Jefferson Chemical Co.
[5]Polymer Prepolymer of THANOL SF-5503 polyol and THANATE P-210 Polyisocyanate (eq. wt. 326)
[6]Polymer Prepolymer of THANOL SF-5503 polyol and THANATE P-220 Polyisocyanate (eq. wt. 337)

EXAMPLE IX

This example illustrates the preparation of an isocyanate rich polymer prepolymer from THANOL E-4003 diol (a 4,000 molecular weight adduct of propylene glycol with propylene oxide and ethylene oxide) and THANATE P-220 polyisoynate.

Into a two-liter three-necked flask equipped with a stirrer, thermometer, condenser, dropping funnel and nitrogen source was charged 450 g. THANOL E-4003, 450 g. THANATE P-220 polyisoyanate and 10 g. azobisisobutyronitrile. Maintaining a nitrogen purge, the reaction mixture was heated to 75°C. and a mixture of 50 g. styrene and 50 g. acrylonitrile was added over a 3.5 hour period. This was followed by a two-hour digestion period. The reaction mixture was then stripped to 5 mm. Hg. at 120°C. Monomer conversation was 90.3 percent. The final product was an opaque, dark brown, thixotropic liquid. Two pieces of aluminium were joined together with this isocyanate-terminated polymer prepolymer. The adhesive properties were excellent.

EXAMPLE X

This experiment will illustrate the use of a prior art polymer/polyol in the preparation of a flexible polyurethane foam. A foam was prepared as in Example VIII C employing a polymer/polyol and THANATE P-220 polyisocyanate. The formulation, details of preparation and foam properties are shown in the following table:

Table 2

| Formulation, pbw | |
|---|---|
| Niax 34-28 [7] | 100 |
| Water | 3.0 |
| Dabco LV-33 | 0.3 |
| THANCAT DM-70 | 0.25 |
| Niax A-I | 0.12 |
| Dibutyltin dilaurate | 0.02 |
| THANATE P-220 | 53.4 |
| Isocyanate index | 1.05 |
| Details of preparation | |
| Cream time, sec. | 10 |
| Rise time, sec. | 150 |
| Gel time, sec. | 330 |
| Properties | |
| Foam appearance | Large coarse cells |
| Density, pcf | 3.25 |
| Tensile, psi | 21.5 |
| Elongation, % | 50 |
| Tear, pli | 2.2 |
| Compression set | |
| 50% | 60 |
| 75% | 73.6 |
| Humid aging (5 hrs. at 250°F.) | |
| Compression set, 50% | 66.9 |
| CLD loss, 50% | 20.7 |

[7] A polymer/polyol having a hydroxyl number of approximately 26 and containing about 20% polymer, Union Carbide Chemical Co.

The foam in Example VIII C was considerably more attractive in appearance and exhibited better overall properties than the foam prepared in this Example.

We claim:

1. An isocyanate-terminated polyether-based polymer prepolymer composition consisting of a polymer dispersed in an isocyanate-terminated polyether-based prepolymer composition, wherein said prepolymer composition is obtained by reaction of a polyether polyol and an organic polyisocyanate, in a ratio such that the isocyanate index is from about 4 to about 20, said polyether polyol having a molecular weight of from about 2,000 to about 10,000 and being formed by reaction of an alkylene oxide of from 2 to 4 carbon atoms with a polyhydric alcohol initiator having a functionality of from 2 to 6, said organic polyisocyanate having a functionality of from 2 to 4, and said polymer is obtained by polymerizing one or more ethylenically unsaturated monomers which are non-reactive with isocyanato groups in the presence of an effective amount of a free radical catalyst and in the presence of the prepolymer composition with said polymer being present in the polymer prepolymer composition in an amount of from about 5 to about 25 weight percent, based upon the total polymer prepolymer composition.

2. The polymer prepolymer composition according to claim 1, wherein the prepolymer composition is obtained by reaction of an organic polyisocyanate having a functionality of from 2 to 4 and a polyether polyol having a molecular weight of from 2,000 to about 7,000 and having a functionality of 2 or 3.

3. The polymer prepolymer composition of claim 2 wherein the polymer is obtained by polymerizing one or more ethylenically unsaturated monomers selected from the group consisting of vinyl chloride, vinyl acetate, methyl methacrylate, acrylonitrile and styrene.

4. The polymer prepolymer composition of claim 3 wherein the polymer is obtained by polymerizing a mixture of acrylonitrile and a co-monomer selected from the group consisting of vinyl acetate, vinyl chloride, methyl methacrylate and styrene in a weight ratio of acrylonitrile to co-monomer of from about 3:1 to about 1:3.

5. The polymer prepolymer composition of claim 4 wherein the polymer is present in an amount of from about 10 to about 20 weight percent, based upon the total polymer prepolymer composition.

6. The polymer prepolymer composition of claim 5 wherein the prepolymer composition is obtained by reaction of an organic polyisocyanate and a polyether triol having a molecular weight of from about 4,000 to about 7,000.

7. The polymer prepolymer composition of claim 6 wherein the polyether triol is the reaction product of glycerin or trimethylolpropane and an alkylene oxide of from 2 to 4 carbon atoms.

8. The polymer prepolymer composition of claim 5 wherein the prepolymer composition is obtained by reaction of an organic polyisocyanate and a polyether diol having a molecular weight of from about 2,000 to about 5,000.

9. The method of preparing an isocyanate-terminated polyether-based polymer prepolymer composition comprising polymerizing one or more ethylenically unsaturated monomers which are non-reactive with isocyanato groups in the presence of an effective amount of a free radical catalyst and an isocyanate-terminated polyether-based prepolymer composition at a temperature of from about 50°C. to about 150°C., and recovering the polymer prepolymer composition from the reaction mixture, said ethylenically unsaturated monomers being present in an amount of from about 5 to about 25 weight percent, and said iocyanate-terminated polyether-based prepolymer composition being formed by the reaction of an organic polyisocyanate having a functionality of from 2 to 4 with a polyether polyol having a molecular weight of from about 2,000 to about 10,000, which polyether polyol is the reaction product of an alkylene oxide of from 2 to 4 carbon atoms and a polyhydric alcohol initiator having a functionality of from 2 to 6, with said organic polyisocyanate and said polyether polyol being present in a ratio such that the isocyanate index is from about 4 to about 20.

10. The method according to claim 9 wherein the isocyanate-terminated polyether-based prepolymer composition is obtained by reaction of an organic polyisocyanate having a functionality of from 2 to 4 and a polyether polyol having a molecular weight of from 2,000 to about 7,000 and having a functionality of 2 or 3.

11. The method according to claim 10 wherein the ethylenically unsaturated monomers are selected from the group consisting of vinyl chloride, vinyl acetate, methyl methacrylate, acrylonitrile and styrene.

12. The method according to claim 11 herein the ethylenically unsaturated monomers are a mixture of acrylonitrile and a co-monomer selected from the group of vinyl acetate, vinyl chloride, methyl methacrylate, and styrene in a weight ratio of acrylonitrile to co-monomer of from about 3:1 to about 1:3.

13. The method according to claim 12 wherein the ethylenically unsaturated monomers are a mixture of acrylonitrile and styrene.

14. The method according to claim 13 wherein the isocyanate-terminated polyether-based prepolymer composition is obtained by reaction of an organic polyisocyanate having a functionality of from 2 to 4 and a polyether triol formed by reaction of glycerin or trimethylolpropane with an alkylene oxide of from 2 to 4 carbon atoms, with the polyether triol having a molecular weight of from about 4,000 to about 7,000.

15. The method according to claim 13 wherein the isocyanate-terminated polyether-based prepolymer composition is obtained by reaction of an organic polyisocyanate having a functionality of from 2 to 4 and a polyether diol formed by reaction of propylene glycol with an alkylene oxide of from 2 to 4 carbon atoms, with the polyether diol having a molecular weight of from about 2,000 to about 5,000.

16. The method according to claim 9 wherein the isocyanate-terminated polyether-based prepolymer is formed concurrently with the polymerization of the ethylenically unsaturated monomers.

17. A polyurethane composition prepared by reacting an isocyanate-terminated polyether-based polymer prepolymer composition (A) and a polyether polyol (B) having a molecular weight of from about 2,000 to about 10,000 and being formed by reaction of an alkylene oxide of from 2 to 4 carbon atoms with a polyhydric alcohol initiator having a functionality of from 2 to 6, said isocyanate-terminated polyether-based polymer prepolymer composition (A) consisting of a polymer dispersed in an isocyanate-terminated polyether-based prepolymer composition, wherein the prepolymer composition is obtained by reaction of a polyether polyol (B) and an organic polyisocyanate having a functionality of from 2 to 4, in a ratio such that the isocyanate index is from about 4 to about 20, with said polymer being obtained by polymerizing one or more ethylenically unsaturated monomers which are non-reactive with isocyanato groups in the presence of an effective amount of a free radical catalyst and in the presence of the isocyanate-terminated polyether-based prepolymer composition, with said polymer being present in an amount of from about 5 to about 25 weight percent, based upon the total polymer prepolymer composition (A).

18. The polyurethane composition according to claim 17 wherein the isocyanate-terminated polyether-based prepolymer composition (A) is prepared by reacting a polymethylene polyphenyl polyisocyanate having a functionality of from about 2.1 to about 3.0 with a polyether polyol (B) having a functionality of 2 or 3 and a molecular weight of from about 2,000 to about 7,000.

19. The polyurethane composition according to claim 18 wherein the polymer in the isocyanate-terminated polyether-based polymer prepolymer composition (A) is obtained by polymerizing one or more ethylenically unsaturated monomers selected from the group consisting of vinyl chloride, vinyl acetate, methyl methacrylate, acrylonitrile and styrene.

20. The polyurethane composition according to claim 19 wherein the ethylenically unsaturated monomers are a mixture of acrylonitrile and a co-monomer selected from the group of vinylchloride, vinyl acetate, methyl methacrylate and styrene in a weight ratio of acrylonitrile to co-monomer of from about 3:1 to about 1:3.

21. The polyurethane composition according to claim 20 wherein the ethylenically unsaturated monomers are a mixture of acrylonitrile and styrene.

* * * * *